US005897095A

United States Patent [19]

Hickey

[11] Patent Number: 5,897,095

[45] Date of Patent: Apr. 27, 1999

[54] SUBSURFACE SAFETY VALVE ACTUATION PRESSURE AMPLIFIER

[75] Inventor: Kurt Allen Hickey, Broken Arrow, Okla.

[73] Assignee: Baker Hughes Incorporated, Houston, Tex.

[21] Appl. No.: 08/694,359

[22] Filed: Aug. 8, 1996

[51] Int. Cl.[6] .................... F16K 31/122

[52] U.S. Cl. .................... 251/57; 138/31

[58] Field of Search .................... 251/57; 138/31; 60/413, 416

[56] References Cited

U.S. PATENT DOCUMENTS

| | | | |
|---|---|---|---|
| 2,747,370 | 5/1956 | Traut | 138/31 X |
| 2,843,349 | 7/1958 | Meyer . | |
| 4,163,412 | 8/1979 | Porter | 138/31 X |
| 4,442,902 | 4/1984 | Doremus, et al. . | |
| 4,953,591 | 9/1990 | Takagi et al. | 138/31 X |
| 5,101,904 | 4/1992 | Gilbert . | |

FOREIGN PATENT DOCUMENTS

| | | |
|---|---|---|
| 2135951 | 5/1996 | Canada . |
| 1098499 | 1/1968 | United Kingdom . |
| WO 81/01692 | 6/1981 | WIPO . |

*Primary Examiner*—Kevin Lee

*Attorney, Agent, or Firm*—Rosenblatt & Redano P.C.

[57] ABSTRACT

A hydraulic pressure booster is disclosed which, when used in conjunction with a control system for a subsurface safety valve, allows the use of lower pressure ratings on the wellhead equipment, yet at the same time provides sufficient hydraulic pressure to actuate a subsurface safety valve at depths that could exceed 4,000 feet. A preferred embodiment compensates for any fluid loss through the seals to ensure effective operation. The hydraulic pressure booster comprises an amplifier to receive fluid pressure from a fluid pressure source and magnify the pressure. A conduit system facilitates connection of the pressure source to the amplifier and the magnified pressure from the amplifier to the subsurface safety valve. The system is simple and self-regulating and can be alternatively installed as an integral portion of the subsurface safety valve or immediately adjacent the subsurface safety valve or immediately below the wellhead.

20 Claims, 2 Drawing Sheets

SUBSURFACE SAFETY VALVE ACTUATION PRESSURE AMPLIFIER

FIELD OF THE INVENTION

The field of this invention relates to subsurface safety valves which are controlled from the surface and a control pressure amplifier which facilitates use of wellheads having lower pressure ratings for subsurface safety valves mounted at significant depths.

BACKGROUND OF THE INVENTION

In some locations, the use of subsurface safety valves is mandated. Historically, this has been in locations such as in the Gulf of Mexico where wells were drilled on the Outer Continental Shelf to fairly shallow depths. The subsurface safety valves used in those applications required control lines which went to the surfaces with the subsurface safety valve generally deployed at depths of about 1,000 ft. The subsurface safety valve was maintained in a closed position by a return spring which was sized to keep a sleeve in the position required for the valve to be closed against the hydrostatic forces in the control line, as well as any pressures in the wellbore surrounding the subsurface safety valve.

As wells began to be drilled more deeply and subsurface safety valves had to be placed further and further below the surface, the force necessary for the return spring to resist these forces became far greater with increasing depth. Thus, one approach that was used previously was simply to increase the pressure rating of the control components, including the wellhead, so that they would be suitable for the pressures expected. Other techniques involved use of pressurized chambers to offset the effect of hydrostatic forces or equalization techniques to neutralize the effects of such hydrostatic forces. U.S. Pat. No. 4,660,646 illustrates the use of pressurized chambers to offset the return spring forces. U.S. Pat. No. 5,415,237 illustrates the use of valving arrangements to obtain the requisite pressure balance on the sliding sleeve so as to minimize the forces required to actuate the sleeve against a much smaller return spring.

These techniques were fairly complex, involving numerous moving parts and seals. While they accomplish the purpose of allowing wellheads of a lower pressure rating to be used, even in applications involving significant depths such as 10,000 ft., their cost was high and the numerous components used made maintenance and upkeep an issue. Accordingly, the apparatus and method of the present invention have been developed to allow a simple way to be able to use low-pressure wellheads, even in applications of fairly deep subsurface safety valves in the order of deeper than 10,000 ft., where the pressure rating on the wellhead can be fairly minimal, such as 5,000 PSI, yet the subsurface safety valve can operate effectively. The device can be installed at or near the surface or adjacent the wellhead to make access and maintenance considerably easier. The simple design dictates that the device is low cost and easy to install. By virtue of fairly minor changes in the configuration of the device, any given degree of amplification that would be needed for current applications and those likely to occur in the future can be achieved.

SUMMARY OF THE INVENTION

A hydraulic pressure booster is disclosed which, when used in conjunction with a control system for a subsurface safety valve, allows the use of lower pressure ratings on the wellhead equipment, yet at the same time provides sufficient hydraulic pressure to actuate a subsurface safety valve at depths that could exceed 4,000 feet. A preferred embodiment compensates for any fluid loss through the seals to ensure effective operation. The system is simple and self-regulating and can be alternatively installed as an integral portion of the subsurface safety valve or immediately adjacent the subsurface safety valve or immediately below the wellhead.

DETAILED DESCRIPTION OF THE PREFERRED EMBODIMENT

Figure 1:
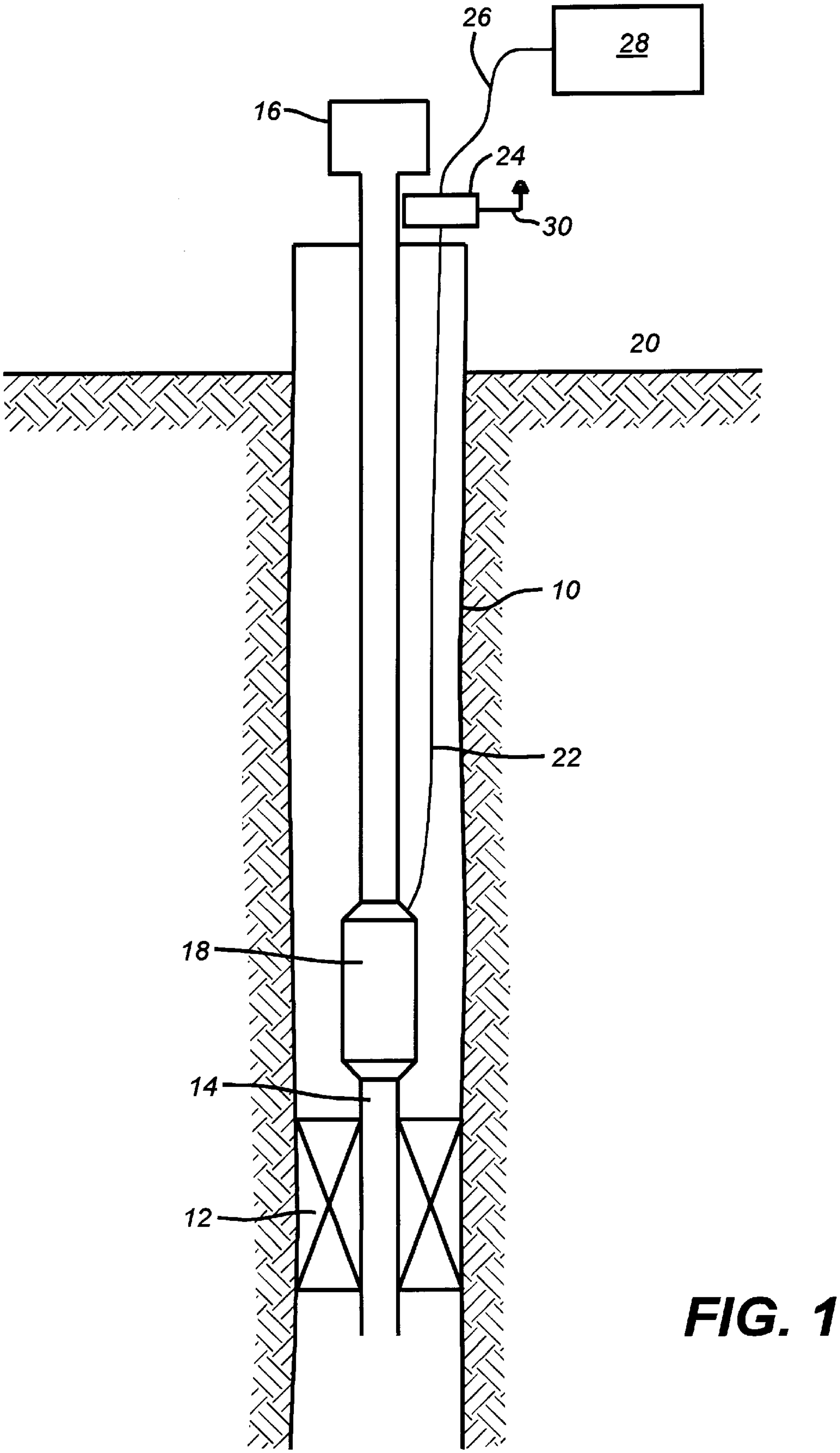
FIG. 1 is an elevational schematic view of a typical well installation, showing the placement of the amplifier.

FIG. 1 illustrates a wellbore 10 which has a packer 12 through which extends a production tubing string 14. The tubing string 14 extends to the surface wellhead 16. The wellhead 16 is connected to piping for further processing and transmission of the hydrocarbons produced. Within the tubing string 14 is a subsurface safety valve (SSV) 18, which is preferably of the flapper type and is well-known in the art. One such embodiment of this type of valve is illustrated in the previously mentioned U.S. Pat. No. 4,660,646. The SSV 18 can conceivably be mounted thousands of feet below the surface 20. In order to actuate the SSV 18 into the open position, pressure must be applied from the surface through control line 22. Those skilled in the art can appreciate that, if the SSV 18 is 10,000 ft below the surface, a column of fluid within the control line 22, which is 10,000 ft high, acts upon the sliding sleeve whose movement is used to hold the flapper open. In order to make the SSV 18 failsafe closed, a return spring is customarily used which, in older designs, has had to be stiff enough to resist at least the hydrostatic column of fluid in the control line, such as 22. Accordingly, in order to overcome the force of the spring acting on the sliding sleeve within the SSV 18 from the surface, a pressure greater than the hydrostatic force at the SSV 18 had to be applied at the surface. The reason for this was that the spring resisted all the hydrostatic forces and, therefore, its force had to be overcome from the surface to get movement within the SSV 18 to get it to stay open. Since this spring was stiff, moving it required a large force. Thus, in prior designs the need to apply such high pressures from the surface required that the wellhead 16 be rated for the anticipated pressures in the control system and a comfortable margin of safety.

As shown in FIG. 1 the present invention employs an amplifier, schematically illustrated as 24 in FIG. 1. The amplifier 24 is connected to the control line 22 and into a fluid pressure inlet 26, which is connected to a low-pressure hydraulic fluid source 28. A vent 30 is also provided. While the amplifier 24 is shown adjacent to wellhead 16, it can be installed downhole anywhere along the tubing string 14 or can be made integral with the SSV 18. However, access becomes much better if it is mounted adjacent the wellhead 16.

Figure 2:
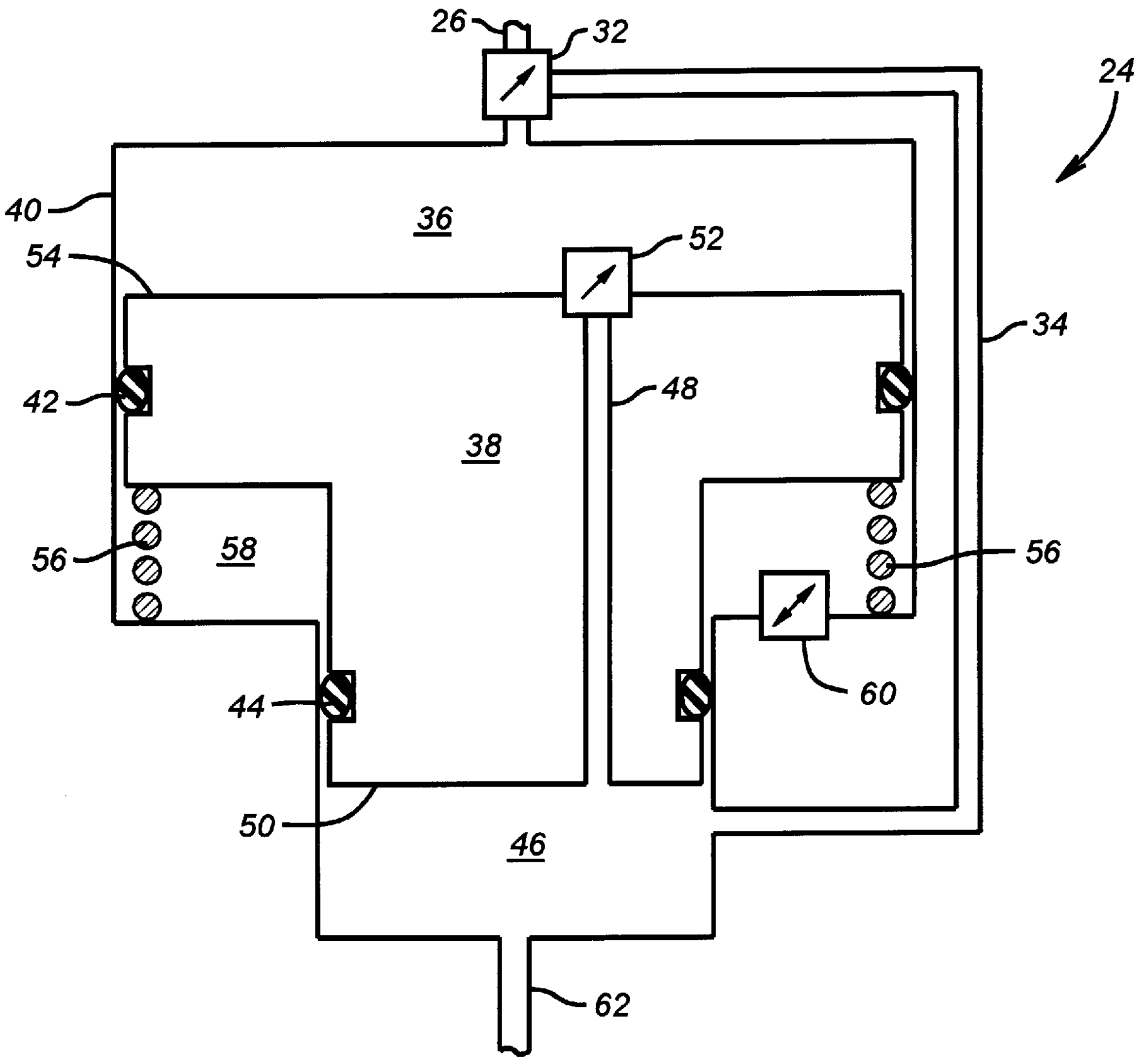
FIG. 2 is a detailed view of the amplifier in a schematic representation of how it operates.

Reference to FIG. 2 illustrates how the preferred embodiment operates. As shown in FIG. 2, inlet 26 is connected to valve 32. Valve 32 is connected to line 34, as well as to chamber 36. Piston 38 is disposed within housing 40. Seal 42 seals around piston 38, thus defining variable volume cavity 36. Seal 44 helps to define variable volume cavity 46. The cross-sectional area of cavity 46 is smaller than the cross-sectional area of cavity 36. Line 34 runs into cavity 46.

The piston 38 has a line 48 extending from its lower face 50 to valve 52, which is mounted adjacent the upper face 54. Spring 56 is disposed in chamber 58. Seals 42 and 44 help define chamber 58 which varies in volume as piston 38 moves. Chamber 58 has a valve 60, which functions as a breather, as will be explained below.

Outlet 62 is connected to the control line 22.

The components now having all been described, the operation of the particular embodiment illustrated in FIG. 2 will be explained. The purpose of the 3-way valve 32, which can direct pressure from the hydraulic fluid source 28 alternatively into chamber 36 or line 34, is to ensure that the piston 38 has stroked upwardly sufficiently so that when it is pushed downwardly toward outlet 62, a sufficient amount of fluid will be displaced to ensure that the SSV 18 fully opens. If there is any compressible fluid in chamber 46, it is displaced to chamber 36 through valve 52. In other words, valve 32 is programmed to align itself with passage 34 until pressure is built up to a predetermined amount. By pressurizing chamber 46, any compressible fluids which may have gotten in there through leakage around seal 44, are displaced through line 48 through valve 52, which, in essence, acts as a check valve, allowing flow in line 48 only in the direction toward upper face 54 but not in the reverse direction. Thus, if there's any entrapped compressible fluid in chamber 46, it is pushed out through line 48 into chamber 36 through valve 52.

The pressure is then further built up on valve 32, which causes it to be shifted to a position aligning the inlet 26 to chamber 36 while at the same time blocking off line 34. Pressure is then applied in chamber 36 which acts on upper face 54. Piston 38 moves downwardly, compressing spring 56 and displacing fluid out of chamber 46 into outlet 62. The amplification is the area ratios of surface 54 to surface 50. On order to allow the piston 38 to move downwardly, valve 60 allows fluid to be displaced out of chamber 58. Subsequently, in order to allow the SSV 18 to close, the pressure is reduced at the fluid pressure source 28, which allows the valve 32 to once again shift positions so that the pressure in chamber 36 is reduced. This can be done by venting chamber 36 through valve 32 into the control system at the surface 20, or more directly by simply allowing chambers 36 and 46 to equalize through line 34 or through valve 52. Once that happens, spring 56 is of sufficient strength to move piston 38 upwardly as valve 60 allows fluid to enter chamber 58 to facilitate movement of piston 38. Spring 56 only needs to resist friction on piston 38 since at this time piston 38 is nearly in hydraulic balance.

Yet another way that chambers 36 and 46 can be equalized is by merely reducing the pressure in chamber 36 which allows flow through line 48 and valve 52 to equalize the chambers 36 and 46. Valve 60 acts as a breather, sometimes allowing fluid to escape out of housing 40 when the piston 38 is shifted toward outlet 62 while allowing fluid to enter chamber 58 as the piston 38 is returned by spring 56. Valve 60 can be connected to the annulus or to another location, such as the surfaces if desired.

It should be noted that the design is equally workable with the elimination of valves 32 and 52 and the replacement of valve 60 with a vent hole. In this embodiment, line 34 is eliminated. Instead, the pressure is applied directly at inlet 26 into chamber 36 to displace the piston 38. The piston 38 is enabled to move because instead of having valve 60 there is an open vent in its place which allows fluid to be moved into and out of chamber 58. The amplification is obtained when the piston 38 moves under pressure in chamber 36.

Again, the amplification ratio is the ratio of the area of upper face 54 to lower face 50. One disadvantage of the elimination of valves 32 and 52 and the substitution of an opening for valve 60 is that, to the extent there has been any leakage around seal 44, a mechanism would not exist to remove compressible fluids from below the piston 38. If too much compressible fluid accumulated in chamber 46, stroking of the piston 38 may not result in sufficient actuation of SSV 18 to put it in the open position. This situation could occur over an extended period of time if any leakage occurs around seal 44.

Those skilled in the art can now see that when the amplifier 24 is used in conjunction with a control system for an SSV 18, the requisite hydraulic pressure can be obtained at the SSV 18 to open it while at the same time using a significantly lower pressure source 28 and a wellhead 16 rated at lower pressures. For example, if the SSV 18 is at 10,000 ft below the surface, a 5,000 psi-rated wellhead can still be used in conjunction with the amplifier 24.

The design of the amplifier 24 as shown in FIG. 2 is simple and reliable, allowing this objective to be easily accomplished.

The foregoing disclosure and description of the invention are illustrative and explanatory thereof, and various changes in the size, shape and materials, as well as in the details of the illustrated construction, may be made without departing from the spirit of the invention.

What is claimed is:

1. In combination, a subsurface safety valve for a well having a wellhead and a control system therefor, said control system comprising:

a fluid pressure source;

an amplifier to receive fluid pressure from said source and magnify said pressure; and a conduit system to facilitate connection of said pressure source to said amplifier and said magnified pressure from said amplifier to said subsurface safety valve.

2. The combination of claim 1 wherein said amplifier further comprises:

a housing;

a movable piston in said housing having a first piston area in communication with said pressure source and a second piston area in communication with said subsurface safety valve; and said first piston area in conjunction with said housing defining a first variable volume cavity and said second piston area in conjunction with said housing defining a second variable volume cavity.

3. The combination of claim 2 wherein said first piston area exceeds said second piston area.

4. The combination of claim 3 wherein:

said piston is biased in a direction which reduces the volume of said first variable volume cavity.

5. The combination of claim 4 wherein:

said first variable volume cavity is defined by a first seal between said piston and said housing; and said second variable volume cavity is defined by a second seal between said piston and said housing.

6. The combination of claim 5 wherein:

said biasing is accomplished by a spring.

7. The combination of claim 6 wherein:

said spring is mounted within said housing in a third variable volume cavity; and said third variable volume cavity having a passage to allow fluid to enter or exit as the volume changes of said third variable volume cavity.

8. The combination of claim 7 wherein:

said third variable volume cavity is defined between said piston and said housing and between said first and second seals.

9. The combination of claim 5 wherein:

said piston further comprises a passage between said first and second piston areas and a check valve which permits flow in said passage only from second piston area to said first piston area.

10. The combination of claim 9 wherein:

said conduit system further comprises a three way valve which can connect said fluid pressure source selectively to said second or first variable volume cavities.

11. The combination of claim 10 wherein:

said three way valve initially aligns said fluid pressure source to said second variable volume cavity to displace out of said second variable volume cavity at least some compressible fluids which may have entered such cavity.

12. The combination of claim 11 wherein:

said displacement of at least some compressible fluids out of said second variable volume cavity occurs through a passage through said piston in which said check valve is mounted.

13. The combination of claim 12 wherein:

said three way valve shifts position after said displacement of at least some compressible fluids out of said second variable volume cavity to align said fluid pressure source to said first variable volume cavity for movement of said piston against said biasing force.

14. The combination of claim 13 wherein:

said biasing is accomplished by a spring.

15. The combination of claim 14 wherein:

said spring is mounted within said housing in a third variable volume cavity; and said third variable volume cavity having a passage to allow fluid to enter or exit as the volume changes of said third variable volume cavity.

16. The combination of claim 8 wherein:

said third variable volume cavity is defined by said first and second seals.

17. The combination of claim 1 wherein:

said amplifier is mounted near the surface of a well below the wellhead so that the wellhead is not exposed to said magnified pressure from said amplifier.

18. A fluid pressure amplifier comprising:

a housing;

a piston in said housing having an inlet area larger than an outlet area and dividing said housing into an inlet cavity and an outlet cavity;

a valve member to selectively direct applied pressure into said inlet or outlet cavities; and a vent to allow accumulated compressible fluids to be displaced out of said outlet cavity prior to stroking said piston which occurs as a result of pressurizing said inlet cavity through movement of said valve member.

19. The amplifier of claim 18 wherein:

said piston further comprises a check valve which allows compressible fluid to be displaced through said piston out of said outlet cavity into said inlet cavity when said valve member aligns a pressure source into said outlet cavity.

20. The amplifier of claim 19 wherein:

said housing comprises a biasing cavity within which is disposed a return spring, said biasing cavity vented through said housing to allow fluid in or out as the volume of said biasing cavity changes.

* * * * *